L. A. JONES.
MEANS AND METHOD FOR MEASURING VISIBILITY.
APPLICATION FILED DEC. 15, 1917.

1,437,809.

Patented Dec. 5, 1922.
4 SHEETS—SHEET 1.

WITNESSES:
Donald H. Stewart
Helen M. Fraser

INVENTOR.
Loyd A. Jones,
BY Ray L. Stinchfield
Newton N. Perris
ATTORNEYS.

Patented Dec. 5, 1922.

1,437,809

UNITED STATES PATENT OFFICE.

LOYD A. JONES, OF ROCHESTER, NEW YORK, ASSIGNOR TO EASTMAN KODAK COMPANY, OF ROCHESTER, NEW YORK, A CORPORATION OF NEW YORK.

MEANS AND METHOD FOR MEASURING VISIBILITY.

Application filed December 15, 1917. Serial No. 207,327.

*To all whom it may concern:*

Be it known that I, LOYD A. JONES, a citizen of the United States of America, residing at Rochester, in the county of Monroe and State of New York, have invented certain new and useful Improvements in Means and Methods for Measuring Visibility, of which the following is a full, clear, and exact specification.

The subject of this invention is a means and method for measuring the visibility of an object with respect to its background, for comparing the visibilities of different objects against the same background and for measuring brightness.

It is a well known artifice to paint such objects as marine vessels with markings that tend to reduce their visibility against the sky and sea; but, as far as I am aware, there has hitherto been no reliable means for determining or comparing the efficiency of different markings; and the immediate object of this invention is to furnish such a reliable means, although the apparatus here described is further capable of and is intended for use as a photometer or actinometer.

The object is attained by the interposition between an observer and the object to be observed of a glare of diffused light. This has the effect of a mist or fog in nature in veiling the object and its background; and, as the brightness of the glare compared with that of the object and its background is increased, the contrast between the object and its background will be lessened until a point is reached where the object is no longer distinguishable from the background.

My invention consists of this method of measuring and comparing visibility and brightness and of the apparatus, as an entity and in all of its parts and modifications, as herein described, for carrying out this method.

Reference will now be had to the accompanying drawings, in which the same reference character indicates the same element throughout.

Figure 12 is a perspective view of another embodiment of my invention.

Figures 13 and 14 show in perspective two different devices that may be used with the instrument as light sources.

Figure 15 shows in perspective a framework used with the instrument shown in Figure 12 as a support and to complete the central chamber.

Figures 16 and 17 show in perspective two photometric wedges in their respective carrier.

Figure 17$^A$ shows in perspective another wedge in its carrier.

While the pieces of apparatus particularly shown and described are operative embodiments of my invention, it is to be understood that many modifications are contemplated and that these embodiments shown are but illustrative, and in the carrying out of the invention I do not at all limit myself to any of the specific structures shown and may substitute elements equivalent in function to those described.

In the embodiment shown in Figures 1 to 11, there is a chamber A, each end wall of which has an opening. On one end wall is mounted a tube 2 in which is mounted an eye piece, the position of which is adjustable by means of the helical slot 4 in the tube and pin 5 in the eye piece carrier. On the opposite end wall 6, is mounted a tube 7 carrying a similarly adjustable objective. The eye piece and objective tubes are easily removable and the instrument is operative without them. A space is left at 3 for the insertion of a color screen if desired.

Figures 1, 2, 3, 4, 5:
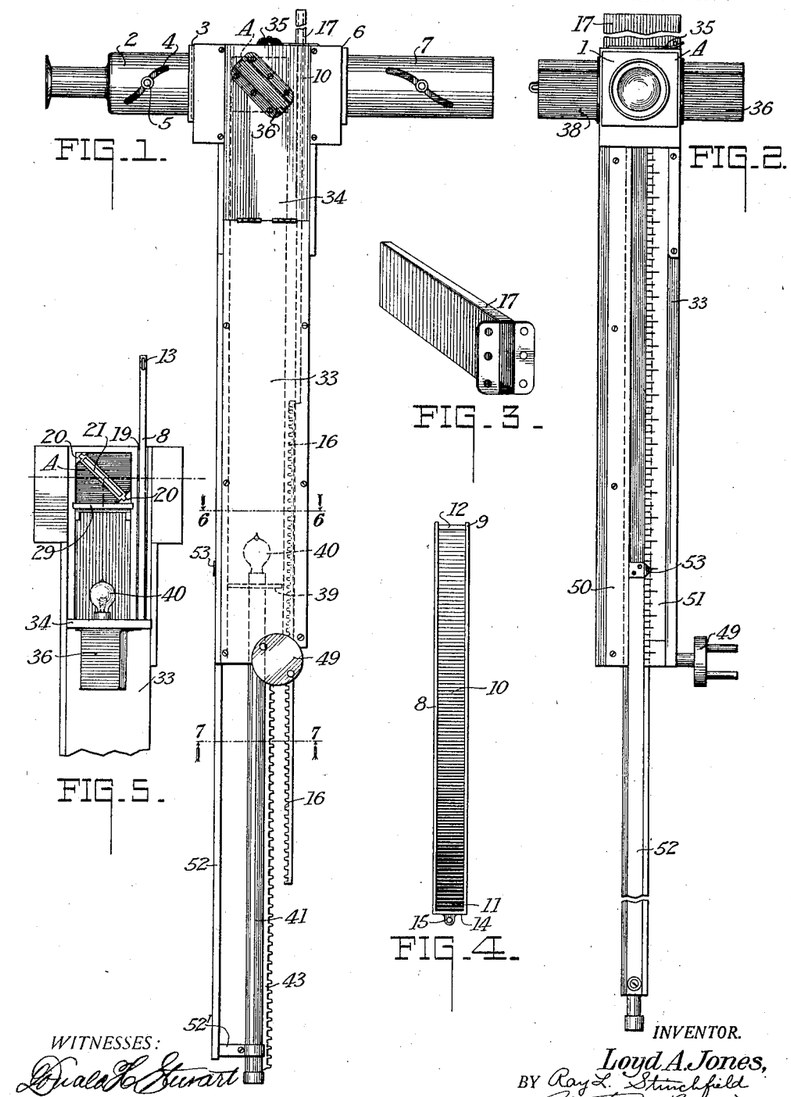
Figure 1 is a plan view of an instrument embodying features of my invention.
Figure 2 is an elevation from the left side of Figure 1.
Figure 3 is a perspective view of a protective casing for a photometric wedge.
Figure 4 is an elevation of the photometric wedge.
Figure 5 is a fragmentary plan view with a hinged cover open to show the interior.

Mounted to slide transversely of the chamber A across the opening in the end 6 is a channelled or grooved frame 8 open at one end 9. A photometric wedge 10 of neutral gray non-diffusing material is insertable into this frame and is carried by it with the thick end of the wedge 11 at the closed end of the frame. The wedge is normally held in place by a pin 12, which engages aperture 13 in the frame. The particular material of which this wedge is made is not essential, but I have found it preferable to make it of cast gelatin, carrying dye, with glass sides. The essential characteristic is that it shall vary uniformly in opacity from end to end and be non-diffusing, and as it is moved back and forth it will gradually and uniformly transmit more or less light from the objective to the interior of chamber A. Any means of varying, without diffusion, the transmitted light would be considered an equivalent of this wedge. The closed end 14 of the frame is attachable, as by an eye 15, to the end of a rack 16 by which it is moved. When in the outermost position, the end of the wedge and frame pass through a slot 19 on the side of the chamber and are protected by a frame 17 which is secured in place over the slot as by screws 18.

Figure 8:
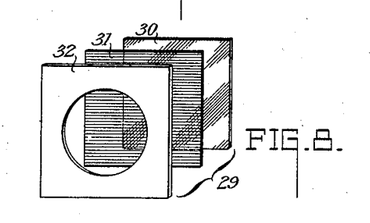
Figure 8 is a view of a diffusing plate, the elements being shown separated.
Figure 9:
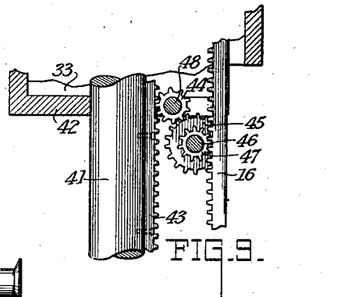
Figure 9 is a sectional view on the line 9—9 of Figure 7.
Figures 10, 11:
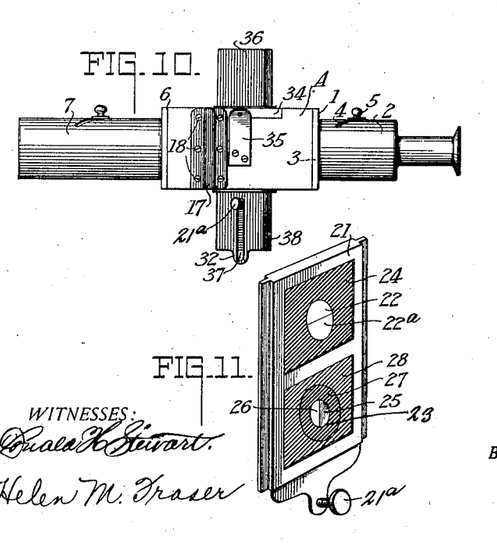
Figure 10 is an end view of the instrument.
Figure 11 is a view of a slide carrying a semi-transparent mirror and a photometric screen.

Mounted diagonally of the chamber A in a pair of channelled ways 20 is a slide 21 carrying a semi-transparent mirror 22, such as a platinized mirror and a photometric screen 23. The mirror and screen may be of any desired shape. The mirror is mounted in a black background 24. Across half the mirror is a strip of colorless transparent gelatin 22a which reflects slightly more light than the uncovered portion. The photometric screen is, as is usual, divided into a transmitting portion 25 and reflecting portion 26, and is mounted in a black background 27, surrounded by a gray background 28. One side of chamber A is open and across the opening is removably mounted a diffusing screen 29. While the particular structure of this screen is quite immaterial, I prefer to make it of a piece of flashed opal or ground glass 30, and a color filter screen 31, both removably held against the frame 32.

Figure 6:
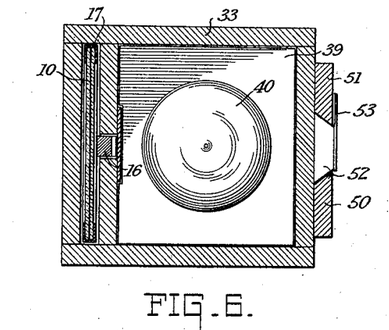
Figure 6 is a sectional view on the line 6—6 of Figure 1.
Figure 7:
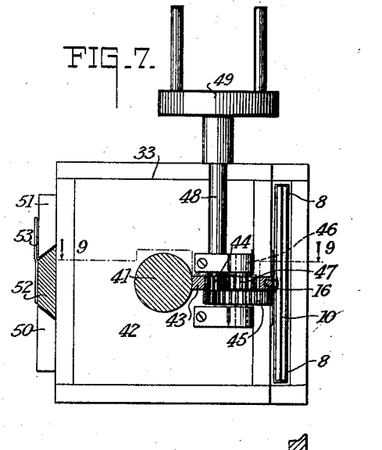
Figure 7 is an end view of the instrument, certain elements being shown as on the section line 7—7.

Extending from this open side of the chamber is an elongated box 33. On the top near the chamber is hinged a cover 34 which overlies the chamber and renders the interior thereof accessible. The cover is normally held in place by a spring clip 35. The cover is slotted so that the upper part of slide 21 may pass through it into a protecting frame 36. The frame is moved and held in adjusted position by means of a thumb screw 21a carried at the lower end thereof and engaging in a slot 37 in a protecting frame 38. The rack 16 and frame 17 slide in guides or ways at one side of the box 33. Fitting in the box is a carrier 39 upon which is mounted an electric lamp 40; this carrier is mounted on the end of a rigid tube 41 which slides in an opening in the end 42 of the box. Upon the tube 41 is mounted a rack 43, which engages a pinion 44, which engages a gear 45, the gear 45 being mounted on a shaft 46, upon which is also mounted a pinion 47 which engages rack 16. On the shaft 48 of pinion 44 is mounted an actuating handle 49.

On the exterior of the box are fixed two undercut strips 50 and 51 forming a runway for a slidable strip 52 which is rigidly connected at 52' with the tube 41. On the end of strip 52 is a pointer 53 that passes over graduations on strip 51. It will be evident that when handle 49 is turned the pinion 44 engages rack 43 and moves the lamp 40 and pointer 53, while the rack 16, and wedge 10 are moved in the same direction at a slower rate.

In order to attain the best efficiency it is desirable that the total field brightness due to the brightness of the light transmitted through the mirror from the observed object and its background and the reflected light should remain substantially constant, so that variations in brightness will not change the sensitiveness of the retina of the eye and thus affect the results. This desideratum may be attained by properly designing the constants of the instrument, such as the relative sizes of the pinions, the slope and opacity of the wedge element, the reflecting and transmitting ratio of the mirror, etc., this being a matter of mechanical design. Good results may be obtained if it is not attained.

The color screen 31 is usually a "daylight filter" used to eliminate from the artificial light the undesired color components and render both reflected and transmitted light the same color. If the object viewed is also artificially lighted, the color filter would be removed and the diffusing screen alone used, or any color filter may be used that may be necessary when the light sources are different.

Since color contrast is one of the characteristics of protective markings, a color screen may be inserted at 3 to determine under what color conditions different markings are more or less efficient.

In use the telescope is focused on the desired object which may be a vessel or model with protective markings placed before a natural or artificial background. This is done with the thin end of the wedge or the least opaque part of any equivalent member obstructing the passage of light, or with the wedge removed from such obstructing position. Then the handle 49 is slowly turned, simultaneously moving the thicker portion of the wedge across the line of sight and the lamp 40 nearer to the diffusing screen 29. The component of the brightness of the visible field due to the light transmitted from the viewed object is decreased as the component due to the reflection of diffused light from the lamp is increased. There is thus thrown in front of the object viewed a veiling glare, and both the object and the background lose in brightness. The contrast between them is decreased until a point is reached at which the observer is no longer able to distinguish them. On account of the different reflecting ability of the two parts of the mirror, it furnishes a very sensitive medium for the detection of the vanishing point of the object viewed. The gelatin covered portion will be somewhat brighter than the uncovered portion, and if the line between the two crosses the object, part of the object will disappear while part is still visible. Thus, uniformity in detecting the disappearing point for different objects may be obtained. The reading of the pointer 53 on scale 51 is then noted. Other objects are then substituted in turn for the first one with the same background and a reading taken for each. The scale reading records a constant indicating the positions of the lamp and the wedge, and gives a record in an arbitrary brightness unit, which is proportional to the product of the veiling glare and the opacity of the system comprising the elements through which light is transmitted from the object. The series of readings thus constitute, for the particular background and atmospheric conditions, a reliable criterion of measurement and comparison of the visibility of the different objects viewed.

Although the instrument may well be used to measure the visibility of actual marine vessels, it will probably, in practice, be used for the comparison of models of different markings against a common background under the same conditions, it being possible to substitute in the place of the model or object a reflector of known reflecting power and hence to ascertain very exactly under a standard condition the efficiency of different models or objects.

For purposes of illustrating the theory on which the instrument operates, consider an object of uniform brightness and color, behind this being a uniformly illuminated field or background of uniform reflecting power and color. Now let $B_1$ = Brightness of field or background;
$B_2$ = Brightness of object;
$B_3$ = Brightness of a reflector of known reflecting power R in the object plane;
$B_4$ = Brightness of glare field of instrument, that is, the brightness due to reflected light;
$B_5$ = Total field brightness as seen in the instrument at the time a setting is made.
$B_v$ = Brightness of the veiling glare that would be required to make the object just visible against the field;
$I_1$ = Illumination on object plane;
$T_1$ = Transmission of absorbing wedge;
$T_2$ = Transmission of semi-transparent mirror, and
$K$ = Contrast sensibility of retina, with eye adapted to the total field brightness $B_5$.

It is evident that $B_5$ is made of two components, one, $B_4$, being reflected and the other being transmitted. Since $B_5$ is the limiting value at which $B_1$ and $B_2$ become apparently equal, this component is $B_1(T_1.T_2)$. Therefore, $$B_5 = B_4 + B_1(T_1.T_2) \quad (1)$$

While theoretically $B_v$ might be obtained without using the wedge, by increasing the veiling glare alone, this is not practical as too great a reflected glare would be necessary to balance the transmitted daylight. However, since the value of $B_v$ is the product of the brightness ($B_4$) of the glare field at the time of a setting by the opacity of the system, it may be written $$B_v = \frac{B_4}{T_1.T_2} \quad (2)$$

It is evident that $$K = \frac{B_1 + B_v}{B_2 + B_v} \quad (3)$$

The weather conditions may be specified by the ratio $\frac{B_1}{I_1}$, $I_1$ being easily determinable since $$I_1 = \frac{B_3}{R} \quad (4)$$

Since visibility is represented by $\frac{B_v}{B_1}$, a curve showing the variation of visibility of the various objects to be compared with weather conditions may be plotted, the ordinates being $\frac{B_v}{B_1}$ and $\frac{B_1}{I_1}$. A comparison of curves thus made will show for any value of $\frac{B_1}{I_1}$ which object shows the lowest visibility, or for a given range of values of $\frac{B_1}{I_1}$ which shows the lowest average visibility. To obtain the complete data for such curves, it is necessary to obtain only the values of $B_v$, $B_1$ and $I_1$. As already described, the positions of the light and wedge are adjusted until the object is just visible as viewed through the instrument, or, in case the differential principle of the divided glare field is used until the object is just visible in one half of the glare field and not visible in the other half. The scale reading on 51 at this point gives from constants of the instruments previously determined the value of $B_v$, since, as already noted, the readings are proportional to the product of the veiling glare and the opacity of the system.

The value of $B_1$ is determined by substituting the photometric field for the glare field by moving slide 21 to its upper position, and determining the brightness of the field by an ordinary photometric reading. $I_1$ is determined by means of equation (4) by taking a photometric reading of a reflector of known reflecting power R placed in the object plane.

The above discussion relates only to brightness comparisons of uniformly illuminated neutral gray fields and objects, and is made in order that the method of using the instrument may be fully apparent.

The same principle of operation is embodied in the instrument illustrated in Figures 12 to 22, in which 70 and 71 indicate two hollow members arranged at an angle, and 72 and 73 designate supporting wall members between the hollow members. This framework rests on a support shown in Figure 15, comprising a base 74, front and rear walls 75 and 76, and angular wall members 77 and 78, having registering openings 79 and 80. Member 71 rests on the sloping edges of members 77 and 78, and the front and rear walls 75 and 76 fit under and support ledges 75′ and 76′ of member 70. There is thus formed a chamber A′ corresponding in its functions to the chamber A of Figure 1. The upper wall is formed by the member 70 which has an aperture through it. The member 71 passing through the chamber diagonally has an aperture and mounted thereon is a frame 21ᵃ carrying a semi-reflecting mirror 22′ similar to mirror 22. In the upper surface of the member 70 is a way in which may be slipped a diffusing screen 29′, similar to screen 29, which is covered by a plate 81 carrying a flange 82, with lugs 83. Over the opening 79 is secured a plate 84 with flange 85, the plate being spaced from wall 75 to provide a way 86 in which may be placed a color screen 86ᵃ, such as was used in the space 3. This is a gelatin screen mounted on a card having a central aperture. In the hollow members 70 and 71 are slidable frames 87 and 88 carrying respectively wedges 89 and 10′. Frame 87 has a pointer 53′ which extends through a slot in member 70 and registers with a scale 51′ on member 71, and a lug 90 which extends through a slot in 70. Frame 88 has at one end a lug 91 extending through a slot 92 in member 71 and at the other end a photometric screen 26′.

Figures 12, 13, 14, 15, 16, 17, 17A:
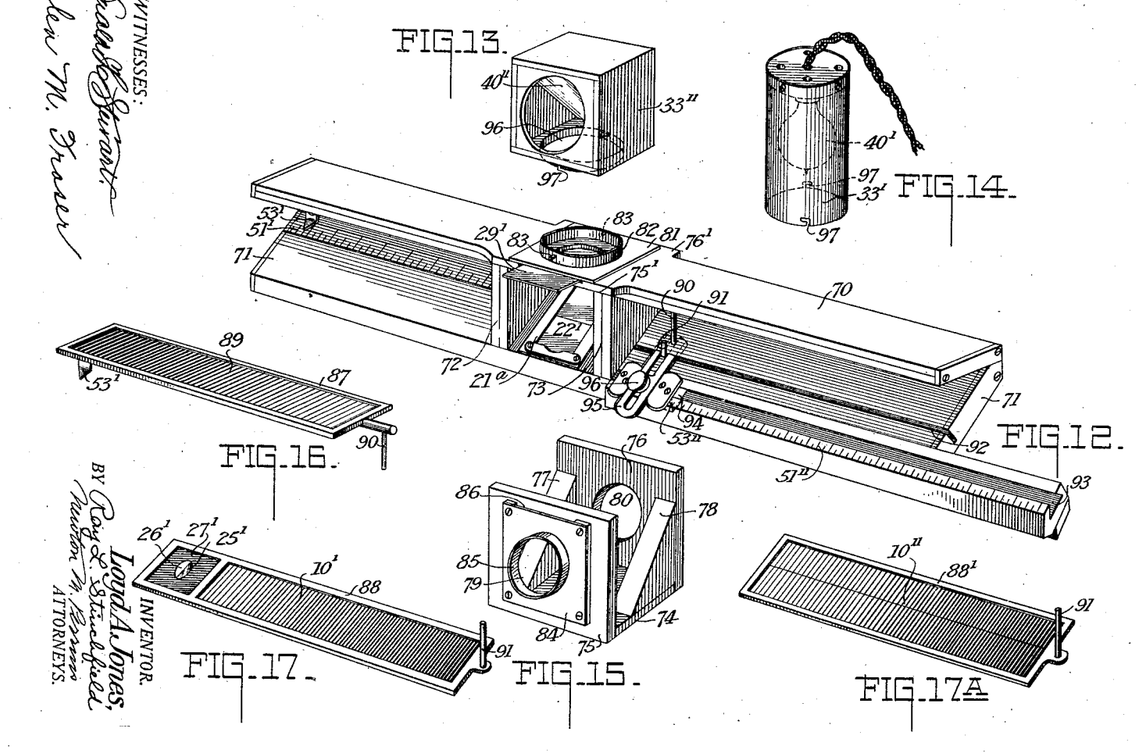
Figures 18, 19, 20, 22:
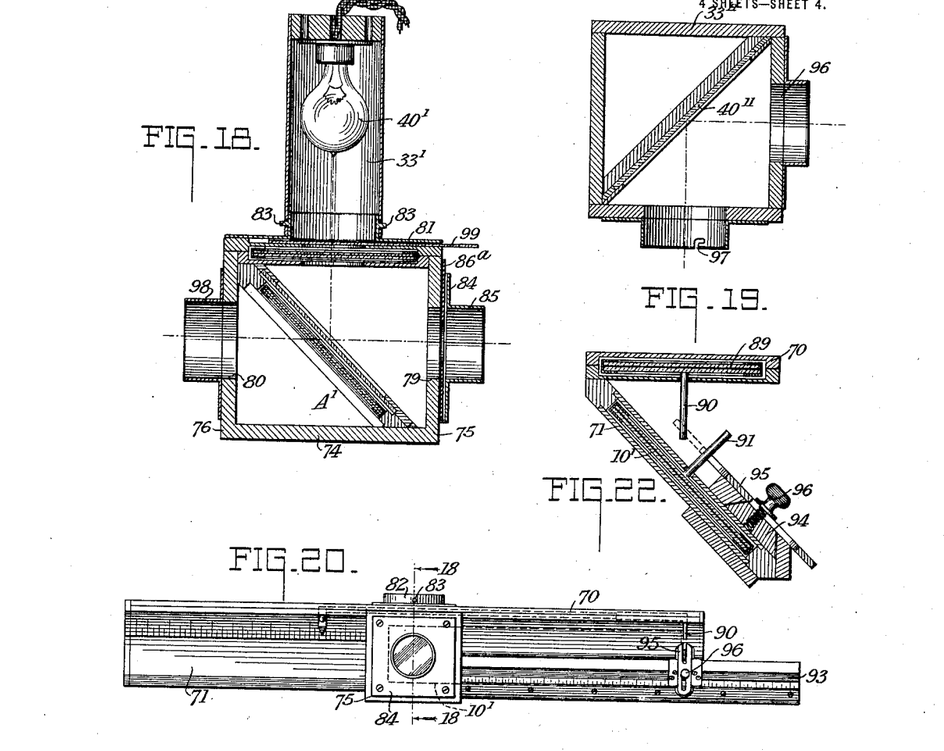
Figure 18 is a sectional view taken on a line 18—18 of Figure 20.
Figure 19 is a sectional view of the attachment shown in Figure 13.
Figures 20 and 21 are front and rear elevations respectively of the instrument shown in Figure 12.
Figure 22 is a sectional view taken on line 22 of Figure 21.
Figure 21:
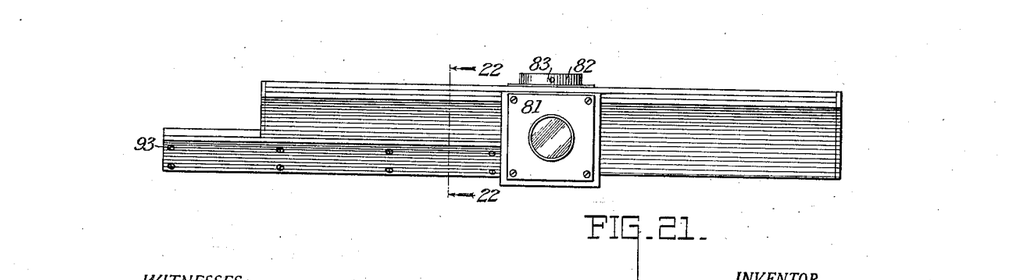

The thin edge of wedge 89 is adjacent lug 90 and the blunt end of wedge 10′ is adjacent lug 91. Mounted on member 71 is a channelled way 93 in which is slidable a block 94 carrying a transversely slidable plate 95, which may be fixed in adjusted position by means of the thumb screw 96, so that it may engage lugs 90 and 91, lug 91 only, or neither lug. It is thus apparent that either wedge may be moved independently of the other, or both may be moved simultaneously. The edge 53″ of the support 94 is used with scale 51″ to obtain readings. A glare of light may be furnished from an electric lamp 40′ mounted in a box 33′ or from a mirror 40″ mounted in a box 33″ and adapted to reflect light rays entering the box through opening 96. The lamp 40′ or mirror 40″ thus constitutes a source of light for the chamber. Either form of box is attached to the intrument by bayonet slots 97 adapted to engage lugs 83. A colored diffusing screen 99 similar to that used in the first instrument would be used with the lamp 40′; but a diffusing screen only would be used with box 33″, as the reflected light is the same as the transmitted light. An apertured flanged plate 98 covers opening 80 and the tubes 2 and 7 shown in Figure 1 may be slipped over flanges 85 and 98.

In use the desired object is viewed through the telescope thus attached or through the front and rear openings of the chamber, the mirror 22′ and wedge 10′. Handle 96 is then moved, moving both wedges, thus gradually increasing the component of brightness of the visible field due to the reflected light and decreasing the component from the viewed object and its background. If the type of box shown in Figure 13 is used, it may be placed with the opening 96 facing the object to be viewed, so that the source of light for the veiling glare will be the natural light.

It is desirable that the constants of this instrument, as of the one first described, should be such that the total field brightness should be substantially constant, and this is especially true when it is used as an actinometer.

To measure the brightness of the visible field, the slide 95 is disengaged from lug 90 and frame 88 is moved until the photometric screen 26′ is in the center of the field of vision. Mirror 22′ is removed and a photometric determination is made by moving lug 91 and wedge 89, the result being read by means of pointer 53' and scale 51' in any desired brightness units for which the scale may be calibrated. For such a photometric reading the lamp 40' of known brightness must be used.

If desired the semi-transparent mirror 22' may be removed and the surface of the wedge used as a reflecting surface for this purpose. When the instrument is used in this way, I prefer to use a cast gelatin wedge 10'' in a frame 88' in which is incorporated finely divided barium sulphate, the wedge having glass sides. This wedge both absorbs and diffuses the light passing through it, the absorption and diffusion increasing as the thicker part of the wedge is brought across the field of vision. I preferably place a strip of gelatin longitudinally of the wedge, as shown in Figure 17$^A$ to gain the sensitiveness already described. This wedge constitutes a semi-transparent mirror, as that term includes any element which both reflects and transmits light.

When box 33'' is used, the instrument is admirably adapted for use as an actinometer, particularly for photographic purposes. The object viewed would in that case be the subject of the desired photograph. The sliding wedges would be moved until the detail becomes indistinguishable and then the scale reading taken. The scale would, for such use, have been previously calibrated so that the reading could at once be interpreted in terms of stops and exposures proper for the correct photographing of the subject. This is, of course, merely the regular use of the instrument for a particular purpose, since it is the measurement of the visibility of a portion of the subject.

Having thus described my invention, what I claim and desire to secure by Letters Patent of the United States, is:—

1. An apparatus for the purposes specified, comprising a chamber having a transverse member through which an object may be viewed, means for throwing a glare of light into the chamber and means for simultaneously increasing the effective opacity of the transverse member and the brightness of the glare in accordance with a predetermined relation between these quantities.

2. An apparatus for the purposes specified, comprising a chamber through which an object may be viewed, means for varying the apparent brightness of such object and means for casting into the chamber and in the path of light rays from the visible portions of the object a glare of light tending to veil the object.

3. In an apparatus for the purposes specified, a chamber through which an object and its background may be viewed, means for varying the apparent brightness of such object and its background, means for casting into the chamber and in the path of light rays from the visible portions of the object and its background a glare of light tending to veil the object and its background and means for varying the brightness of such glare.

4. In an apparatus for the purposes specified, a chamber through which an object may be viewed, means for casting into the chamber and in the path of light rays from the visible portions of the object a glare of light tending to veil the object and means for varying the brightness of such glare.

5. In an apparatus for the purposes specified, a chamber through which an object may be viewed, means for casting into the chamber and in the path of light rays from the visible portions of the object a glare of light tending to veil the object and means for simultaneously increasing or decreasing the apparent brightness of such object and decreasing or increasing the effective brightness of the veiling glare in accordance with a predetermined relation between these quantities.

6. An apparatus for the purposes specified, comprising a mirror the same area of which reflects and transmits light and a member through both of which an object may be viewed, the effective opacity of the member being variable and means for throwing light upon the mirror.

7. An apparatus for the purposes specified, comprising a mirror the same area of which reflects and transmits light through which an object may be viewed, means for throwing light upon said mirror and means for varying the effective brightness of said light.

8. An apparatus for the purposes specified, comprising means adapted to reflect light from one source and to transmit light from another source, and means to vary simultaneously the brightness of both the reflected and transmitted light in accordance with a predetermined relation.

9. An apparatus for the purposes specified, comprising means adapted to reflect light from one source and to transmit light from another source and means adapted simultaneously to increase the effective brightness of the light from either source and to decrease the effective brightness of the light from the other source the effective brightness of each having a predetermined relation to the effective brightness of the other.

10. An apparatus for the purposes specified, comprising means adapted to reflect light from one source and to transmit light from another source, means adapted simultaneously to increase the effective brightness of the light from either source and to decrease the effective brightness of the light from the other source, and color selective means in the common path of the transmitted and reflected light.

11. An apparatus for the purposes specified, comprising an element adapted to reflect light from one source and to transmit light from another source and means adapted simultaneously to increase the effective brightness of the light from either source and to decrease the effective brightness of the light from the other source, the relation of parts being such that the total reflected and transmitted light is substantially constant.

12. An apparatus for the purposes specified, comprising a chamber having openings at opposite ends and at one side, a mirror the same area of which reflects and transmits light, arranged to reflect toward the opening at one end light entering from the opening at the side and to transmit toward the opening at the said end light entering from the other end and means adapted simultaneously to decrease the brightness of the reflected light and to increase the brightness of the transmitted light or vice versa.

13. An apparatus for the purposes specified, comprising a chamber having openings at opposite ends and at one side a semi-transparent mirror arranged to reflect toward the opening at one end light entering from the opening at the side and to transmit toward the opening at the said end light entering from the other end, means adapted simultaneously to decrease the brightness of the reflected light and to increase the brightness of the transmitted light, or vice versa, and color selective means at the first mentioned end.

14. An apparatus for the purposes specified, comprising a chamber having openings at opposite ends and one side, a semi-transparent mirror arranged to reflect toward the opening at one end light entering from the opening at the side and to transmit toward the opening at the said end light entering from the other end, means adapted simultaneously to decrease the brightness of the reflected light and to increase the brightness of the transmitted light or vice versa, and to maintain substantially constant the sum of the reflected and transmitted light.

15. In an apparatus for the purposes specified, a chamber, a mirror therein, the same area of which reflects and transmits light through which an object may be viewed, means for varying the apparent brightness of such object, means for casting upon the reflecting surface of the mirror a glare of light tending to veil the object and means for varying the brightness of such glare.

16. An apparatus for the purposes specified, comprising a mirror the same area of which reflects and transmits light, and a member through both of which an object may be viewed, means for throwing light upon said mirror and means for simultaneously increasing the effective opacity of the member and the effective brightness of the light.

17. In an apparatus for the purposes described, a chamber having front, side and rear openings, a light diffusing screen located across the side opening, a mirror the same area of which reflects and transmits light, arranged within the chamber so as to transmit light from the rear opening to the front opening and to reflect light from the side opening to the front opening and means for simultaneously decreasing gradually the brightness of the transmitted light and increasing gradually the brightness of the reflected diffused light in accordance with a definite, predetermined relation to the transmitted light.

18. In an apparatus for the purposes specified, a mirror the same area of which reflects and transmits light, through which an object may be viewed, means for casting a glare of light upon the mirror and so placed that the light will be reflected, the mirror being divided into two parts, one of which reflects more light than the other.

19. In an apparatus for the purposes described, a chamber having front, side and rear openings, a mirror the same area of which reflects and transmits light, arranged within the chamber so as to transmit light from the rear opening to the front opening and to reflect light from the side opening to the front opening, the reflecting surface of the mirror being divided into two parts, one of which reflects more light than the other.

20. In an apparatus for the purposes described, a chamber having front, side and rear openings, a mirror the same area of which reflects and transmits light arranged within the chamber so as to transmit light from the rear opening to the front opening and to reflect light from the side opening to the front opening, the reflecting surface of the mirror being divided into two parts, one of which reflects more light than the other, and means for simultaneously decreasing gradually the brightness of the transmitted light and increasing gradually the brightness of the reflected light.

21. In an apparatus for the purposes described, a chamber having front, side and rear openings, a non-diffusing member varying uniformly in opacity from end to end and slidable transversely across said rear opening, a diffusing screen arranged transversely of the said side opening and a semi-transparent mirror adapted both to transmit light from the rear opening and to reflect light from the side opening through the front opening, means adapted to increase gradually the brightness of the reflected light and at the same time to decrease by movement of the non-diffusing member the brightness of the transmitted light.

22. In an apparatus for the purposes described, a chamber having front, side and rear openings, a non-diffusing member varying uniformly in opacity from end to end and slidable transversely across said rear opening, a diffusing screen arranged transversely of the said side opening and a semi-transparent mirror adapted both to transmit light from the rear opening and to reflect light from the side opening through the front opening, means adapted to increase gradually the brightness of the reflected light and at the same time to decrease by movement of the non-diffusing member the brightness of the transmitted light, the reflecting surface of the mirror being divided into two parts, one of which reflects more light than the other.

23. In an apparatus for the purposes described, a chamber having front, side and rear openings, a member carrying a photometric screen and a semi-transparent mirror, said member being slidable across the chamber so that either the photometric screen or the mirror may be placed in the chamber, in such a position as to reflect light from the side opening to the front opening and to transmit light from the rear opening to the front opening.

24. The method of measuring the visibility of an object with respect to a background, which consists in interposing a veiling glare before such portions of the object and the background as are visible and in simultaneously varying the brightness of the veiling glare and the effective brightness of the object and the background, and in maintaining substantially constant the total field brightness.

25. The method of comparing the visibility of different objects with respect to a background, which consists in viewing in turn each object and the background through a veiling glare and in varying the brightness of the veiling glare and the effective brightness of the object and the background and in noting under what conditions each object disappears.

26. The method of comparing the visibility of different objects with respect to a background which consists in viewing in turn each object and the background through a color selective medium and a veiling glare and in varying the brightness of the veiling glare and the effective brightness of the object and the background and in noting under what conditions each object disappears.

Signed at Rochester, New York, this 11th day of Dec. 1917.

LOYD A. JONES.